(12) United States Patent
Bittner

(10) Patent No.: US 6,610,199 B2
(45) Date of Patent: Aug. 26, 2003

(54) WATER TREATMENT APPARATUS WITH CHEMICAL-CONTAINING POD

(76) Inventor: Gene Bittner, 17 N. Frederick Ave., Gaithersburg, MD (US) 20877

( * ) Notice: Subject to any disclaimer, the term of this patent is extended or adjusted under 35 U.S.C. 154(b) by 0 days.

(21) Appl. No.: 09/935,603

(22) Filed: Aug. 24, 2001

(65) Prior Publication Data

US 2003/0038069 A1 Feb. 27, 2003

(51) Int. Cl.$^7$ .......................... B01D 24/10; B01D 27/02
(52) U.S. Cl. .................. 210/95; 210/199; 210/205; 210/232; 210/282; 210/418
(58) Field of Search .............. 210/95, 199, 202, 210/206, 232, 282, 335, 416.1, 418, 438, 205

(56) References Cited

U.S. PATENT DOCUMENTS

| | | | | |
|---|---|---|---|---|
| 531,713 A | * | 1/1895 | Bailey | 210/263 |
| 2,087,157 A | | 7/1937 | Lind | |
| 2,253,684 A | * | 8/1941 | Burckhalter | 210/133 |
| 2,278,488 A | | 4/1942 | Ralston | |
| 2,319,421 A | * | 5/1943 | MacLaren | 210/95 |
| 3,500,652 A | * | 3/1970 | Manns et al. | 62/648 |
| 3,545,616 A | * | 12/1970 | Aspinwall et al. | 210/90 |
| 4,692,246 A | * | 9/1987 | Simon | 210/232 |
| 5,076,922 A | * | 12/1991 | DeAre | 210/282 |
| 5,245,842 A | * | 9/1993 | Searfoss et al. | 62/474 |
| 5,271,837 A | | 12/1993 | Discepolo et al. | |
| 5,378,370 A | | 1/1995 | Brane et al. | |
| 5,443,734 A | | 8/1995 | Fetner et al. | |
| 5,562,824 A | * | 10/1996 | Magnusson | 210/266 |
| 5,772,872 A | | 6/1998 | Shelhamer | |
| 5,774,903 A | | 7/1998 | Wilson et al. | |
| 5,928,506 A | * | 7/1999 | Bae | 210/94 |
| 5,997,747 A | | 12/1999 | Jowett | |
| 6,090,285 A | | 7/2000 | Chau | |
| 6,132,612 A | | 10/2000 | Bourgeois | |
| 6,383,372 B1 | * | 5/2002 | Houck et al. | 210/150 |

* cited by examiner

*Primary Examiner*—Fred Prince
(74) *Attorney, Agent, or Firm*—Liniak, Berenato & White

(57) ABSTRACT

A system for the treatment of water integrating the use of pods. The pods have a sturdy rigid base and a flexible permeable membrane. The tank itself has a viewing port in the sidewall for an observer to witness the treatment process. The tank also has a base with anchor rods for securing the lid. The lid has a monitoring unit and permits the flow of water into and out from the tank. Inserted into the tank is an internal riser tube acting as the return line for the water to the monitoring unit and a directional flow disk. Pods are stacked on top of one another in a predetermined order for the treatment of the water.

17 Claims, 5 Drawing Sheets

WATER TREATMENT APPARATUS WITH CHEMICAL-CONTAINING POD

BACKGROUND OF THE INVENTION

1 Field of the Invention

This invention relates generally to an apparatus for the treatment of water. More specifically, this invention provides a convenient tank with a removable lid, a means to use prepackaged media pods for water treatment and a bypass line to selectively employ specific pods for treatment.

2. Description of Related Art

Existing water treatment systems used by the industry today incorporate multiple tanks as a standard practice when treating water for more than one constituent or water problem. Attempts to use a single tank result in multiple forms of media being placed in one tank that become thoroughly mixed. This is a problem due to the fact that some media have different life spans and densities. At times, particular media need to precede other media in order to perform efficiently and most effectively as the water flows through the treatment process. However, flow and gravity acting upon the media with various densities result with media migrating to other strata.

Manufacturers have produced tanks with a removable lid allowing for the insertion of pod packets. The packets generally consist of a bag tied off at the top with the media located within.

For example, the prior art discloses a deionizing twin bed with a permeable container having an anionic exchanger bed and also have a permeable container having a cationic exchanger bed. However, problems associated with this reference include difficulty with container removal, improper seals between the container and the tank and limited access to the entire system during maintenance or troubleshooting.

The prior art also discloses a tank treatment assembly wherein treatment of the water is facilitated through a plurality of chambers all located within the tank or lid. This design is difficult to service. It is also not compatible with the treatment tanks currently in service.

A treatment tank has been disclosed with a tapered interior wall for receiving permeable containers. The permeable containers hold the media for treating the water. The tapered wall is used to create a seal between the containers and the wall through the use of gravity. However, this tank is difficult to service. The tapered wall also serves to pack the containers in place making removal by an operator difficult. Similarly, water flows randomly through these designs and can create channels. The channels create less resistance to the water increasing the flow rate but significantly lessen the effectiveness of the treatment by the media.

The need therefore exists for a device incorporating pods containing several media for the treatment of a fluid. The container or tank must be standard in the industry, easy to maintain and cost effective to produce. The tank must have a lid easily removable to remove and insert pods within. Also, the lid must be designed so that the industry standard valve may be used to attach the tank the water system. The lid must be flexible enough so that a monitoring unit may or may not be attached, depending on the resources of the operator. In addition, a by-pass line is preferred to blend water from an upper pod by passing lower pods if desired; therefore, changing the final product water for a specific customer, and to eliminate potential pressure build-ups or problems that may develop as well as to allow an operator to trouble shoot potential problem areas. Similarly, a drain valve located at the bottom of the tank to drain the system is necessary. The pods containing media must be interchangeable regardless of desnity, inexpensive, easy to service and maintain. The pods also need to have a means to control the direction of flow of the water to prevent the creation of channels in the pods.

SUMMARY OF THE INVENTION

It is therefore an advantage of the present invention to provide a unit for the treatment of a liquid substance. The main element of the invention comprising a tank wherein an operator has full access to the entire internal volume. Pressure that builds up within the tank can be relieved through a bleed valve and bypass line. The unit also provides filtration of the water through use of permeable forms of media. The tank allows a variety of media with varying densities to be strategically positioned in the flow pattern while preventing the migration of a media into another media during treatment. The media is easily extracted and replaced on an individual basis without have to intermingle with other medias. The entire unit is compatible with standard valves used in the industry thereby ensuring proper performance based on multiple media selection. The tank is constructed from a standard tank currently used in the industry.

Rather than require two or more tanks, additional electric and water to properly treat the water with multiple media the present invention incorporates multiple media treatment into one tank. The media pods can be removed and cleaned by hand should complications with flow and pressure arise. This is extremely beneficial for treatment systems used in a private well or remote location where services are performed by a third-party maintenance service.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

Figure 1:
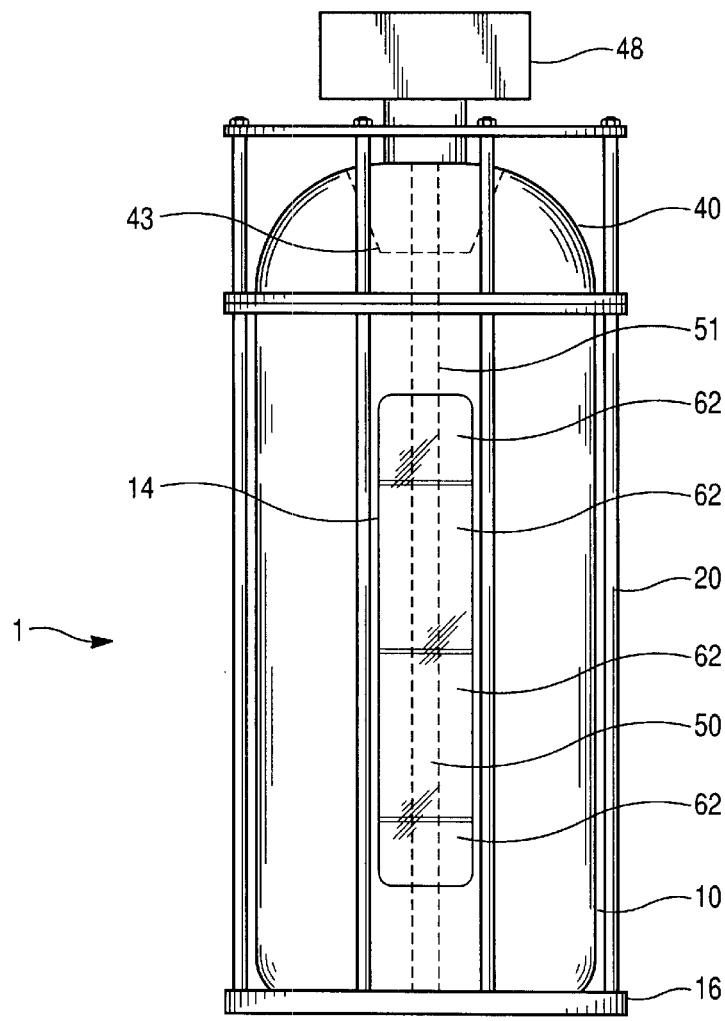
FIG. 1 is a cross sectional profile view of the invention.

A water treatment system generally is shown in the drawings. Referring to FIG. 1, the apparatus 1 is particularly designed for softening and treating water or fluids of a water supply system (not shown). However, it is noted that the apparatus may be used within other systems for purification or treatment of water. The water is treated and conditioned via a plurality of independent softener medias located in packets or pods 62.

As shown in FIG. 1, each treatment system includes a tank 10 preferably in the form of an upright vertical cylinder of substantial length and of relatively small diameter when compared to the length. The dimensions of the tank 10 are similar to those used in the current industry. The interior surface of the tank 10 is smooth. Since several forms of media (chemicals described herein) dissolve during use, a viewing pane 14 is inserted in the sidewall of the tank 10 for an observer to witness the treatment system during operation by providing a profile view. The viewing pane 14 allows an operator to inspect and determine the deterioration amount for media contained in each individual pod 62 without having to remove any of the pods 62 and disrupt the operation of the system. Specific use of the pods 62 is further explained below. The viewing pane 14 is not an essential element of the system and may be omitted depending on user's requirements or needs. The viewing pane 14 is made from material suitable to withstand the pressure generated during the treatment process. Such materials include glass, plexi-glass, polymers, etc. The viewing pane is mounted flush with the walls of the tank 10 to create a smooth, seamless interior curvature. This allows for easy manipulation of the pods 62 within the tank 10 and permits a proper seal to be obtained between the pods 62 and the interior tank walls.

Figure 2:
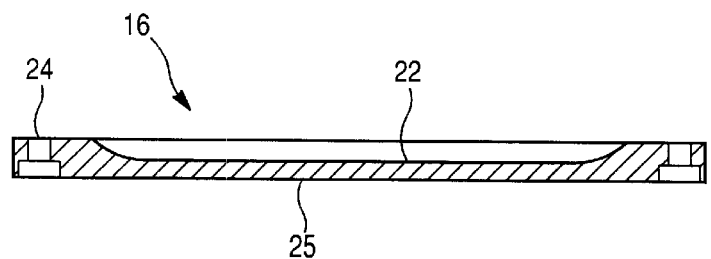
FIG. 2 is a cross section of the base.

Located at the bottom of the tank 10 is a base 16. According to FIG. 2, the base may be a separate element designed to receive the tank 10 such that the bottom curvature of the tank seats flush with a concave portion 22 of the base 16. The diameter of the base 16 is larger than the outer diameter of the tank 10. The ground surface 25 of the base 16 is planar. A plurality of holes 24 preferably is located equidistant from each other along the circumferential edge of the base 16 in the axial direction. The plurality of holes 24 abut anchor rods 20 used to secure the tank 10 to the base as seen in FIG. 1. A suitable fastener is used to secure the anchor rods 20 to the base. The fastening device, e.g., bolts, nuts, are countersunk into a recess in the ground surface 25. Alternatively, the base 16 may be securely fastened to the tank 10 through techniques known to those skilled in the art, e.g., arc-welding.

Figure 3:
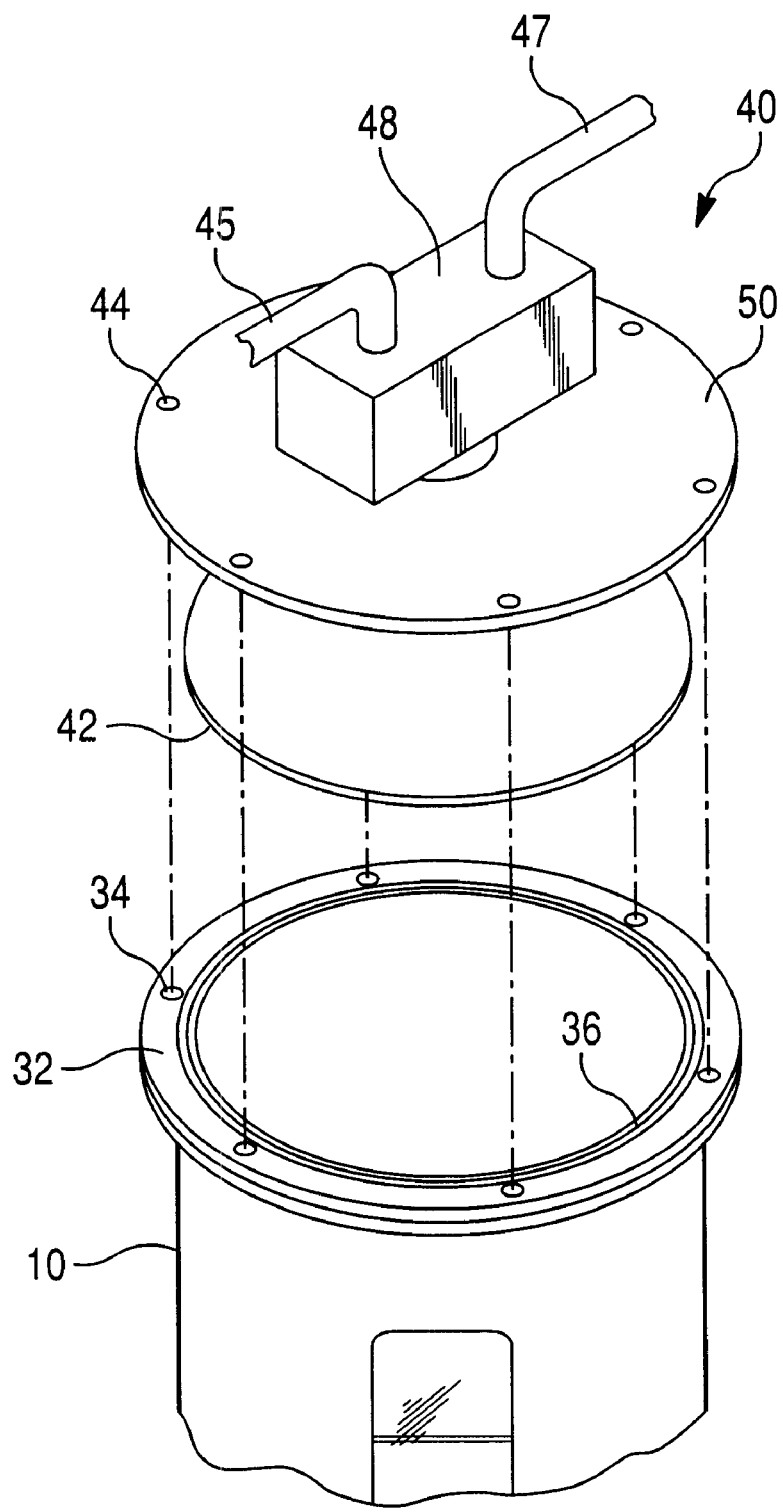
FIG. 3 is a cut away perspective view of the top of the tank and the lid.

Referring now to FIG. 3, the top of the tank 10 is fitted with a union flange 32. The union flange 32 extends radially from the inner circumferential surface of the tank 10. The inner radius of the union flange 32 is fitted with an upper U-shaped gasket channel 36. Located equidistant from one another is a plurality of passages 36. The passages 36 correspond in the radial direction to an equal number of holes 24 in the base and permit the anchor rods 20 secured to the base 16 to extend through the flange 32 in the axial direction.

A lid 40 has a matching diameter with respect to the tank 10 and has a concave configuration such that the circumference tapers towards the geometric center of the tank 10 in the axial direction. Located along the lip 42 of the lid 40 is a U-gasket (not shown). The lip 42 is fitted with a gasket and securely fits into the upper U-shaped gasket channel. The U-gasket on the lip 42 provides a seal between the lid 40 and the tank 10 so as to prevent the contents of the system from escaping during operation.

Referring back to FIG. 1, the lid 40 has a positioning device 43 located on the interior surface of the lid 40. The positioning device 43 allows the lid to be properly situated over the internal riser tube 51 (explained herein).

The lid 40 is securely fit to the top of the tank 10 as shown in FIG. 3. On the upper portion of the lid 40 is placed a monitoring unit 48. The particular monitoring unit 48 may vary depending upon the needs of the treatment system and that of the operator. The monitoring unit 48 is attached to the top of the lid 40 by a valve known to one skilled in the art. The lid 40 is designed to accommodate those valves commonly used in the industry for which the tank is designed. Water is supplied to the system via the pipe work in the monitoring unit 48. Fluid having passed through the treatment system is returned to the monitoring unit via the internal riser tube 51.

At the base of the monitoring unit 48 is a mounting plate 50. The securing disk 50 has a diameter equal to that of the base 16. The mounting plate 50 is made from a substance having substantial stiffness and is capable of withstanding shearing stresses and moment arms. The mounting plate 50 has a plurality of channels 44. The channels 44 directly correspond to the holes 24 and the passages 34. The channels receive the anchor rods 20. A fastener is placed on the anchor rods and secures the lid 40 onto the tank 10.

Figure 4A:
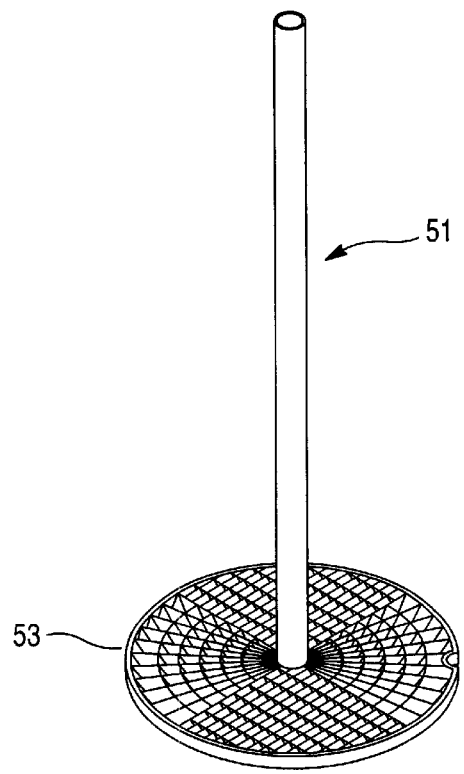
FIG. 4a is a perspective view of the internal riser tube and the directional flow disc.
Figure 4B:
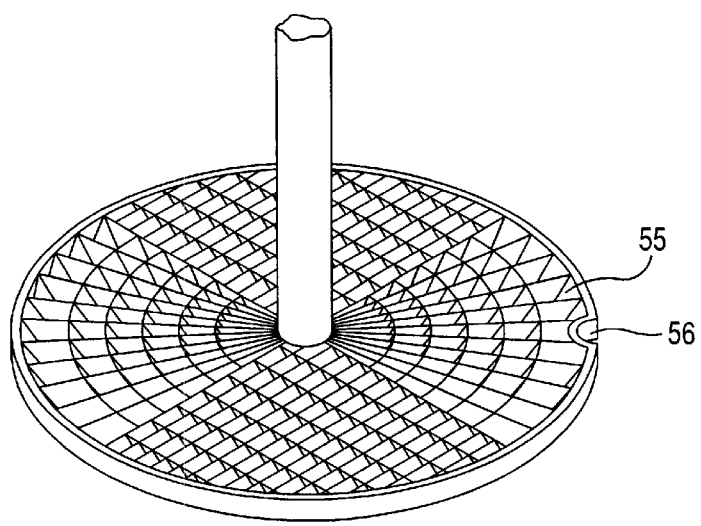
FIG. 4b is an enlarged perspective view of the directional flow disk.

An internal riser tube 51 returns fluid from the bottom of the tank to the monitoring unit 48. The riser tube 51 transports water that has gone through the pods 62 and the treatment process back to the valve connecting the monitoring unit 48. The fluid is finally sent from the monitoring unit 48 to the service destination (not shown). As shown in FIG. 4*a*, the internal riser tube 51 is of sufficient length to extend from the monitoring unit 48 to the bottom of the tank whereon a directional flow disk 53 is located. As shown in FIG. 4*b*, the directional flow disk 53 ensures the radial flow of the fluid by having a plurality of fins preferably 0.25 inches in length angled at 45 degrees and varying in radial and tangential direction. The fins 55 vector the movement of the fluid from a pure axial direction to a combination axial/radial direction. The directional flow disk 53 also provides a foundation support for the pods 62. A notch 56 is cut into the side of the directional flow disk to allow for the insertion of a by-pass line 57 during installation as described below.

Figure 5:
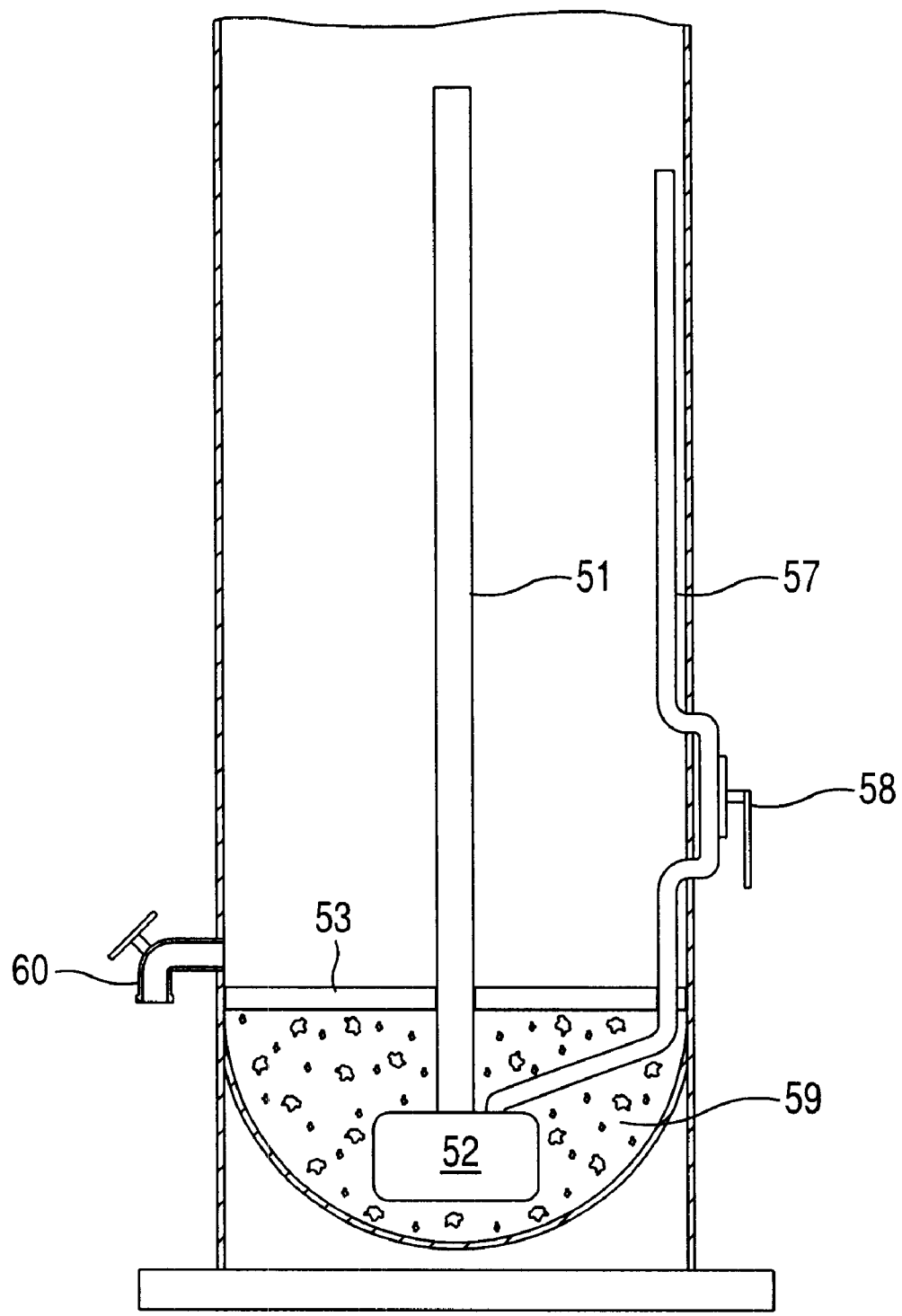
FIG. 5 is a profile view of the bottom of the tank housing the internal riser tube, the directional flow disk and the by-pass line.

Located underneath of the directional flow disk 53 and attached to the internal riser tube 51 is a venturi 52 coupled with a fine slotted collector as shown in FIG. 5. The by-pass line 57 permits the operator to selectively omit the passage of fluid through a pod 62 or series of pods. This controlled flow process is also called blending. The by-pass line 57 is of a diameter equal to the notch 56 cut into the directional flow disk 53. Located in the sidewall of the tank 10 is a petcock 58. The petcock 58 regulates fluid flow through the by-pass tube 57. The venturi 52 creates the vacuum that draws water into the bypass line 57. Supporting the directional flow disk in the bottom of the tank is located a ¼ inch by ⅛ inch washed support gravel under bed 59. On the opposing sidewall of the tank 10 from the petcock 58 is a drain port 60. The drain port 60 is used to relieve any excess pressure or fluid in the system or may also be used to drain the tank 10 when not in use.

Figure 6:
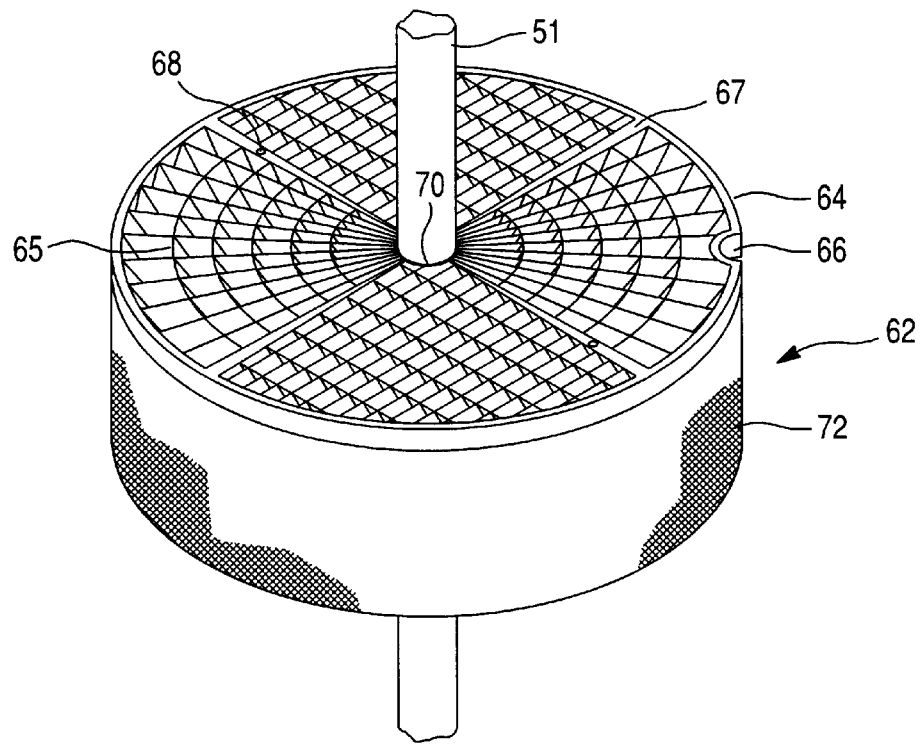
FIG. 6 is a perspective view of pod.

The tank 10 and the overall system as described above all facilitate the use of pods 62 to treat the fluid introduced into the system. Generally, water flows from an intake line 45 originating at an external source to the monitoring unit 48. The water then flows through monitoring unit 48 into the top of the tank 10. From the top of the tank 10, the water flows via potential energy with the aid of gravity towards the bottom of the tank through the pods 62. FIG. 6 shows a physical composition of the pod 62. A base disk 64 is circular in construction and rigid. The base disk has an aperture 70 with a diameter equal to the of the internal riser tube 51 located at the geometric center. The aperture 70 slidably engages the internal riser tube 51. A notch 66 is recessed into the outer circumference to slidably receive the by-pass line once the pod 62 is inserted into the tank 10. The base disk 64 has a plurality of spokes 67 radiating from the aperture 70 that gives structural support to the base disk 64. The spokes 67 have holes an ⅛ inch in diameter for removing the pod 62 via a J-hook (not shown). Traversing between and attached to the spokes 67 are a series of angled fins 65. The fins 65 are angled at 45 degrees and force water through the pods 62 in varying directions to prevent fluid from channeling though the media.

Secured to the underside of the base disk 64 is a permeable membrane 72. The membrane 72 is pervious allowing fluid to freely pass there between. Generally, the cross-section of the base disk 64 corresponds to the cross-section of the tank 10, while the dimensions of the membrane 72 are slightly larger than that of the tank 10. The membrane 72 is somewhat flexible. When the membrane 72 is expanded by the weight of the media and positioned in the tank 10, a seal is created along the interior wall of the tank 10 and that of the membrane 72. The seal prevents fluid from passing from the top of the tank 10 to the bottom of the tank 10 without first passing through the pods for treatment.

Contained within the membrane 72 is a chemical media (not shown) for the treatment of the fluids. A specific sequence wherein the fluid flows from one media to another is required for the proper treatment of fluids. Therefore, each pod 62 will hold a particular media for the treatment of the fluid and the pods 62 will be inserted into the tank 10 in reverse order to ensure that the fluid is treated in the prescribed sequence. The pod 62 prevents the assimilation through migration of different media with different densities. The membranes 72 are constructed with varying depth to accommodate a variety of media sizes.

For example, if birm with a density of 47–50 lbs./cu. ft as a catalyst media and $CaCO_3$ with a density of 100 lbs./cu. ft. to adjust the pH level are selected to treat water, the $CaCO_3$ would treat the water first followed by the birm because of the differences in density. Otherwise, the brim would migrate and mix with the $CaCO_3$, impacting on the efficiency of the overall system. It is noted that some media need to go first in the flow pattern because of the chemical reaction needed for following media to work to their specifications. Examples of other media for treating water through cation/anion exchange are manganese greensand having with a density of 85 lbs./cu. ft., activated carbon having a density of 33 lbs./cu. ft., filter Ag with a density of 24–26 lbs./cu. ft. and calcite having a density of 100 lbs./cu. ft. Another example of a media used for pH adjustment is $M_6O_2$ with a density 100 lbs./cu. ft. Medias may also be combined with one another. For example, $CaCO_3$ may be combined, or blended, with $M_6O_2$ as a specified ratio, 5/1 or 5/2 or 5/3 respectively.

Similarly, antibacterial agents or chlorine removal agents are also used in the treatment of water. Chlorine treatment agents, such as KDF 55 which is copper/zinc alloy particles with a density of 171 lbs./cu.ft., often require the backwash of systems for an extended period of time. Use of these agents coupled with other media not in a pod would might possible purge much of the media during the backwash. By placing all the media within pods, washout is eliminated and migration from one strata to another is avoided. Of course, this invention should not be limited in any way by the types of media employed.

Once the water has passed through the pods 62, potential the water returns to the monitoring unit 48 via the internal riser tube 51. At the monitoring unit 48, the water is transported via the outlet line 47 to the receiving entity (not shown).

Figure 7:
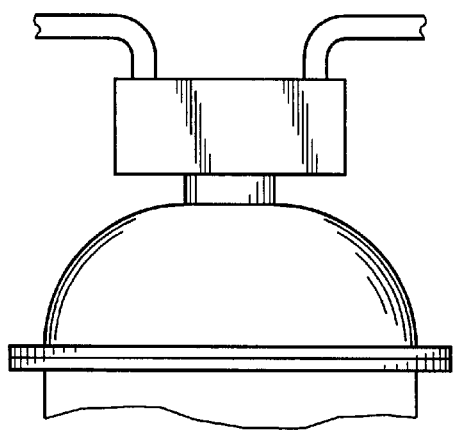
FIG. 7 is an alternate embodiment of securing the lid to the tank.

The features of the invention as explained above, allow for the improved treatment system for a fluid. Thus, a tank 10 is designed to receive multiple pods 62 containing various medias for the treatment of water. The tank 10 also has a by-pass line 57 and a drain port 60 for maintenance, service or adjusted treatment. While the above-described invention is the preferred embodiment, several variations may exist and remain within the scope of the invention. For example, rather than having anchor rods as explained above, the lid is securely fastened directly to the union flange as shown in FIG. 7. The base disks 64 may have a handle or lifting means attached during manufacture to eliminate the need for additional equipment such as a J-hook. Several petcocks may be used to allow access to the water at any level in the tank. The membranes may be constructed so that a single membrane can be used for any number of depths to accommodate media of various volumes. As previously stated, the base 16 may be weld on to the tank via GTAW welding or other method known to the skilled artisan.

What is claimed is:

1. A fluid treatment device for receiving and treating a fluid with at least one chemical medium, said device comprising:
    a main tank body having a fluid input port and a fluid output port;
    at least one pod independently receiving and containing said at least one chemical medium, said at least one pod being removably disposed within said main tank body;
    at least one flow diversion member for controlling a flow path of said fluid through said main tank body from said input port to said output port,
    wherein said flow diversion member comprises a bypass line diverting flow of said fluid around said at least one pod.

2. The fluid treatment device according to claim 1, wherein said at least one pod comprises a plurality of pods stacked within said main tank body.

3. The fluid treatment device according to claim 1, wherein said bypass line runs parallel to an internal wall of said main tank body, said bypass line projects through said internal wall, into an external environment relative to said main body tank; wherein said bypass line further connects with a petcock allowing selective regulation of said fluid around at least one of said plurality of pods.

4. The fluid treatment device according to claim 1, wherein said main tank body further comprises a viewing window, wherein said viewing window allows visual access of an interior portion of the tank from an external environment.

5. The fluid treatment device according to claim 1, wherein a removable lid is selectively fastened to an upper portion of said main body tank.

6. The fluid treatment device according to claim 5, wherein said removable lid comprises a flange with a plurality of recesses for affixing said removable lid to said upper portion of said main tank body via anchor rods.

7. The fluid treatment device according to claim 5, wherein a monitoring device is affixed to said removable lid for said main body tank.

8. The fluid treatment device according to claim 5, wherein anchor rods are utilized to secure said removable lid to said upper portion of said main body tank, wherein said anchor rods extend beyond said upper portion of said main body tank in the axial direction and said anchor rods are affixed to a base of said main body tank, positioned around said base corresponding to a plurality of recesses through said removable lid.

9. The fluid treatment device according to claim 1, wherein said main body tank has a base fastened on a bottom portion thereof; said base has a series of passages for housing anchor rods.

10. The fluid treatment device according to claim 1, wherein said main body tank has a base removably fastened on a bottom portion thereof; said base has a series of passages for housing anchor rods.

11. A fluid treatment device for receiving and treating a fluid with at least one chemical medium, said device comprising:
 a main tank body having a fluid input port and a fluid output port;
 at least one pod independently receiving and containing said at least one chemical medium, said at least one pod being removably disposed within said main tank body;
 at least one flow diversion member for controlling a flow path of said fluid through said main tank body from said input port to said output port,
 wherein said flow diversion member comprises a directional flow disk horizontally disposed within said main tank body and traversing an internal plane defined by an interior of said main tank body, and wherein said directional flow disk comprises a top portion, a bottom portion, a radial edge and a plurality of fins, wherein said plurality of fins selectively divert said flow of fluid through said main tank body.

12. The fluid treatment device according to claim 11, wherein said plurality of fins radiate from a geometric center to an outer circumference of said flow diversion member, wherein said plurality of fins continue from said top portion to said bottom portion at an angle in an axial direction.

13. A fluid treatment device for receiving and treating a fluid with at least one chemical medium, said device comprising:
 a main tank body having a fluid input port and a fluid output port;
 at least one pod independently receiving and containing said at least one chemical medium, said at least one pod being removably disposed within said main tank body;
 at least one flow diversion member for controlling a flow path of said fluid through said main tank body from said input port to said output port,
 wherein said at least one pod comprises:
  a base disk, said base disk further comprising:
   an aperture with a diameter substantially equal to that of an internal riser tube;
   a top surface and a bottom surface;
   a plurality of spokes extending in the radial direction from said aperture, wherein said plurality of spokes has a series of holes extending from said top surface to said bottom surface;
   a plurality of fins radiating from said aperture to an outer circumference of said base disk, wherein said plurality of fins are positioned from said top portion to said bottom portion at an angle in an axial direction; and
   a notch recessed into said outer circumference of said base disk, wherein said notch has a curvature equal to a curvature of a bypass line;
  a membrane, said membrane permits the flow of said fluid through thereof and is securely fastened to said outer circumference of said base disk, said membrane is selectively removable from said base disk so as to permit placement of a medium therein; wherein upon affixing said membrane to said base disk, said medium is restricted within said at least one pod.

14. The fluid treatment device according to claim 13, wherein a series of said least one pod is capable of being placed within said main tank body, wherein said series comprises at least two of said at least one pod.

15. A fluid treatment device for receiving and treating a fluid with at least one chemical medium, said device comprising:
 a main tank body having a fluid input port and a fluid output port;
 at least one pod independently receiving and containing said at least one chemical medium, said at least one pod being removably disposed within said main tank body;
 at least one flow diversion member for controlling a flow path of said fluid through said main tank body from said input port to said output port,
 wherein said at least one flow diversion member includes a riser comprising a direction flow disk and an internal riser tube having a length substantially equal to a height of said main tank body; wherein said directional flow disk comprises:
  a top surface and a bottom surface;
  a plurality of spokes extending in the radial direction from said aperture;
  a plurality of fins radiating from said aperture to an outer circumference of said directional flow disk, wherein said plurality of fins are positioned from said top portion to said bottom portion at an angle in an axial direction; and
  a notch recessed into said outer circumference of said directional flow disk, wherein said notch has a curvature substantially equal to a curvature of a bypass line.

16. A removable pod for the treatment of a fluid, comprising:
 a base disk, said base disk further comprising:
  an aperture with a diameter substantially equal to that of an internal riser tube in a main tank body;
  a top surface and a bottom surface;
  a plurality of spokes extending in the radial direction from said aperture, wherein
 said plurality of spokes has a series of holes extending from said top surface to said bottom surface;
  a plurality of fins radiating from said aperture to an outer circumference of said base disk, wherein said plurality of fins are positioned from said top portion to said bottom portion at an angle in an axial direction; and
 a membrane, said membrane permits the flow of said fluid through thereof and is securely fastened to said bottom portion of said base disk, said membrane is selectively removable from said base disk so as to permit placement of a medium therein; wherein upon affixing said membrane to said base disk, said medium is restricted within said pod.

17. The pod according to claim 16, wherein said base disk further comprises a notch recessed into said outer circumference of said base disk, wherein said notch has a curvature equal to a curvature of a bypass line.

* * * * *